United States Patent [19]

Falk

[11] Patent Number: 4,863,283
[45] Date of Patent: Sep. 5, 1989

[54] THERMOCOUPLE CONNECTOR

[76] Inventor: Richard A. Falk, 122 Nurmi Dr., Ft. Lauderdale, Fla. 33301

[21] Appl. No.: 110,567

[22] Filed: Oct. 13, 1987

Related U.S. Application Data

[63] Continuation-in-part of Ser. No. 855,807, Apr. 24, 1986, abandoned.

[51] Int. Cl.$^4$ .............................................. G01K 7/12
[52] U.S. Cl. .................................... 374/181; 374/179; 374/163
[58] Field of Search ............... 374/139, 140, 181, 182, 374/179

[56] References Cited

U.S. PATENT DOCUMENTS

| | | | |
|---|---|---|---|
| 3,069,909 | 12/1962 | Hines | 374/182 X |
| 3,091,119 | 5/1963 | Fischer et al. | 374/139 |
| 3,444,739 | 5/1969 | Treharne | 374/168 X |
| 3,534,809 | 10/1970 | Charitat, Jr. | 374/182 X |
| 3,610,601 | 10/1971 | Bishop, Jr. | 374/140 |
| 3,685,359 | 8/1972 | Boron et al. | 374/140 X |
| 3,915,002 | 10/1975 | Hance | 374/140 X |
| 4,120,201 | 10/1978 | Wargo | 374/181 |
| 4,147,061 | 4/1979 | Wester et al. | 374/171 X |
| 4,488,824 | 12/1984 | Salem | 374/181 |

Primary Examiner—Daniel M. Yasich
Attorney, Agent, or Firm—Fuller, Puerner & Hohenfeldt

[57] ABSTRACT

Disclosed herein is an electrical connector for a repeating immersion thermocouple lance for molten metal baths which includes a temperature sensor in the connector for sensing the temperature of the lance to detect temperature build up at the cold junction of the thermocouple which could provide a false EMF reading to distort the bath temperature reading of the thermocouple.

3 Claims, 1 Drawing Sheet

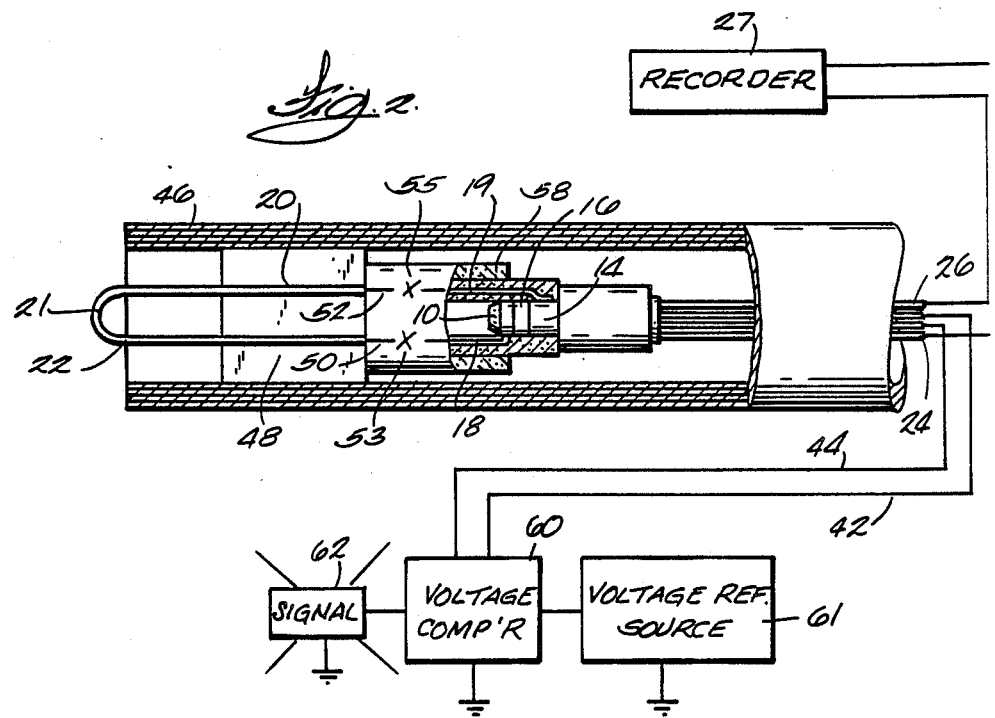
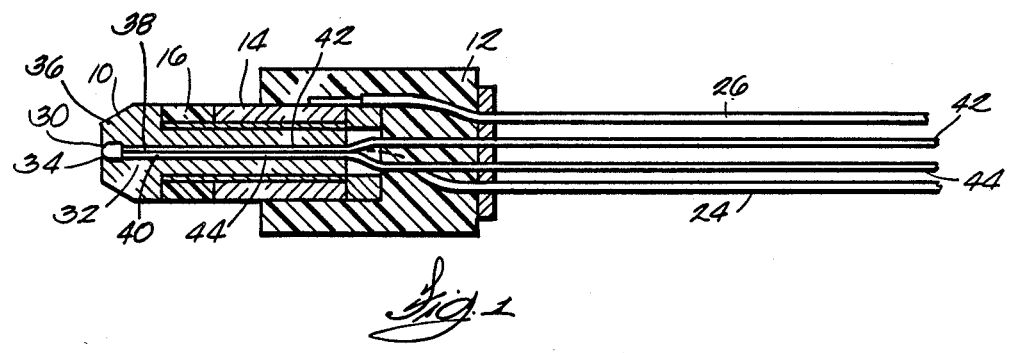

THERMOCOUPLE CONNECTOR

This application is a continuation-in-part of U.S. patent application Ser. No. 855,807 filed Apr. 24, 1986, now abandoned.

BACKGROUND OF THE INVENTION

Various immersion thermocouples have been developed for repetitive measurements of molten metal baths during manufacture of steel or other metals. With repetitive thermocouples which may be immersed repeatedly within a short interval, the temperature of the expendable thermocouple assembly electrical connector between the expendable thermocouple and the immersion thermocouple can rise and the temperature can cause an EMF to be generated at the cold junction of the thermocouple wires and the electrical leads which connect the thermocouple to a recording unit. The EMF generated can provide non-representative test data or temperature data.

SUMMARY OF INVENTION

The invention provides a lance containing a temperature sensor which is located in a thermocouple connector remote from the hot junction of the thermocouple tip but is in close proximity to the cold junction of the thermocouple tip which senses temperature of the thermocouple preferably adjacent the cold junction. A circuit and signal device associated with this temperature sensor provide a signal to the user of the thermocouple lance when the temperature in the area of the connector has achieved a predetermined and preset value which can provide misleading and inaccurate results with the thermocouple. In the preferred embodiment, the temperature sensor is located in the electrical connector which is connected to a temperature recorder, enabling connection of various thermocouple heads or lances which are used for a number of different sampling events.

Further objects, advantages and features of the invention will become apparent from the disclosure.

DESCRIPTION OF THE DRAWINGS

FIG. 1 shows a sectional view of an electrical connector embodying a temperature sensor in accordance with the invention.

FIG. 2 shows a fragmentary sectional view of the electrical connector of FIG. 1 embodied in a temperature measuring immersion lance which is connected to a circuit which provides an identifiable signal.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings FIG. 1 shows an electrical connector or plug generally represented at reference numeral 10 which projects from a nonconductive plug housing 12. The electrical connector or plug 10 is insulated from a second electrical connector 14 by means of a ring 16 of electrically insulating material. These two electrical connectors 10 and 14 are adapted to electrically connect with the leads 18 and 19 of a thermocouple unit 20 housed in a U-shaped fused quartz thermocouple tube 22. The electrical connectors 10 and 14 are electrically connected to leads 24 and 26, which are remotely connected to a temperature recording unit of known construction such as a digital recorder 27 or computer.

In accordance with the invention the electrical plug is provided with a temperature sensing means 30. In the disclosed construction the temperature sensing means 30 comprises a thermocouple element generally represented at reference numeral 32 which can have a hot junction such as platinum-platinum-rhodium, copper-constantan, iron-constantan, chromel-alumel or others at 34 in the tip 36 of the plug 10 with the thermocouple wires 38 and 40 insulated from the plug by refractory cement or the like. The platinum and platinum-rhodium wires 38 and 40 are electrically connected at cold junctions 37, 39, to wires 42 and 44. The temperature sensor 30 sends a voltage over wires 42 and 44 to a voltage comparator/driver 60. This voltage level is compared to a reference voltage supplied by the adjustable voltage reference source 61. If the voltage level supplied by the temperature sensor 30 is greater than the reference voltage supplied by the voltage reference source 61, the voltage comparator/driver 60 activates the signaling device 62.

In use, when the signalling device 62 indicates that a predetermined temperature has been sensed in said plug 10, the operator will forego using the thermocouple lance until the unit cools and the signal light 62 goes off or an audible signal stops.

Referring to FIG. 2, the immersion thermocouple includes a holder or paperboard housing 46 with a mount or block 48 which supports and positively positions the fused quartz thermocouple tube 22. The platinum and platinum-rhodium leads 50 and 52 from the thermocouple 21 are connected to leads 18 and 19 in a tubular socket 58. The socket 58 may be held in place within an extension 54 of the block 48. The leads 18 and 19 contact the electrical connectors 10 and 14 to provide an electrical connection with the leads 24 and 26. The connections 53 and 55 from the cold junction for the thermocouple element 21 in tube 22. The temperature sensor 30 is desirably in close proximity to the cold junction 53 and 55 to sense the temperature at the cold junction.

I claim:

1. A thermocouple lance for immersion in a molten metal bath comprising:
   a. a housing;
   b. a first thermocouple having a hot junction and a cold junction with the first and second electric leads being connected at the cold junction and leading away therefrom;
   c. block means for supporting the first thermocouple within the housing;
   d. socket means supported in the block means for containing the first thermocouple cold junction and the first and second electrical leads leading therefrom;
   e. a first electrical connector inserted into the socket means and being in electrical conduction with the first lead leading from the first thermocouple cold junction;
   f. a second electrical connector inserted into the first electrical connector and being in electrical connection with the second lead leading from the first thermocouple cold junction, the second electrical connector having a tip that extends proximate the first thermocouple cold junction;

g. a second thermocouple installed in the second electrical connector tip for sensing the temperature of the first thermocouple cold junction; and h. circuit means connected to the second thermocouple and including signal means for providing an identifiable signal when the second thermocouple senses a predetermined temperature proximate the first thermocouple cold junction.

2. In combination with a first thermocouple having a cold junction and a recording device, an electrical connector interposed in the electrical path between the first thermocouple cold junction and the recording device, the electrical connector comprising an electrical connector portion having a projecting tip and a second portion retained in a hollow housing, said projecting tip terminating in proximity to the first thermocouple cold junction; and a second thermocouple having leads passing through the electrical connector and being located in the tip of the electrical connector portion for measuring the temperature of the first thermocouple cold junction.

3. In combination with a first thermocouple having a cold junction with first and second leads leading away therefrom, a sensor for measuring the temperature of the first thermocouple cold junction comprising:

a. a first connector having a projecting tip terminating in proximity to the first thermocouple cold junction, the first connector being in electrical connection with the first lead leading from the first thermocouple cold junction;

b. a second electrical connector concentric with the first connector and being in electrical connection with the second lead leading from the first thermocouple cold junction; and c. a second thermocouple located in the tip of the first connector for measuring the temperature of the first thermocouple cold junction.

* * * * *